United States Patent
Kutty et al.

(10) Patent No.: US 10,817,656 B2
(45) Date of Patent: Oct. 27, 2020

(54) METHODS AND DEVICES FOR ENABLING COMPUTERS TO AUTOMATICALLY ENTER INFORMATION INTO A UNIFIED DATABASE FROM HETEROGENEOUS DOCUMENTS

(71) Applicant: ADP, LLC, Roseland, NJ (US)

(72) Inventors: Sanjay Kutty, Pasadena, CA (US); An Hongguo, Pasadena, CA (US); Subhash C. Vinnakota, Pasadena, CA (US); Keith Burke, Pasadena, CA (US); Robert Seres, Pasadena, CA (US); Danniel Condez, Pasadena, CA (US); Erik Hanson, Pasadena, CA (US); Anuradha Verma, Pasadena, CA (US)

(73) Assignee: ADP, LLC, Roseland, NJ (US)

( * ) Notice: Subject to any disclaimer, the term of this patent is extended or adjusted under 35 U.S.C. 154(b) by 0 days.

(21) Appl. No.: 15/821,682

(22) Filed: Nov. 22, 2017

(65) Prior Publication Data
US 2019/0155887 A1    May 23, 2019

(51) Int. Cl.
*G06F 40/174* (2020.01)
*G06K 9/34* (2006.01)
*G06K 9/00* (2006.01)
*H04L 29/08* (2006.01)
*G06F 16/93* (2019.01)

(52) U.S. Cl.
CPC ....... *G06F 40/174* (2020.01); *G06K 9/00449* (2013.01); *G06K 9/00456* (2013.01); *G06K 9/344* (2013.01); *G06F 16/93* (2019.01); *G06K 2209/01* (2013.01); *H04L 67/02* (2013.01)

(58) Field of Classification Search
CPC ............ G06F 17/243; G06F 17/30253; G06K 2209/01
See application file for complete search history.

(56) References Cited

U.S. PATENT DOCUMENTS

| 6,886,136 | B1 | 4/2005 | Zlotnick et al. |
| 6,898,316 | B2 * | 5/2005 | Zhou ............... H04N 1/3872 358/450 |
| 6,950,553 | B1 | 9/2005 | Deere |

(Continued)

OTHER PUBLICATIONS

Denoue et al., "FormCracker: Interactive Web-based Form Filling," DocEng2010, Sep. 21-24, 2010, Manchester, United Kingdom, 4 pages.

*Primary Examiner* — Scott T Baderman
*Assistant Examiner* — Mario M Velez-Lopez
(74) *Attorney, Agent, or Firm* — Yee & Associates, P.C.

(57) ABSTRACT

Enabling a computer to automatically enter information into a unified database from heterogenous documents. An image file is received. The image file is displayed in a first area of a window rendered on a tangible display device. The fields for data entry are displayed in a second area of the window. Optical character recognition is performed on the image file. At least one parameter of text is identified in the image file. The at least one parameter of the text is compared to at least one of a plurality of stored parameters. The text is sorted according to the at least one of the plurality of stored parameters into a plurality of categories, wherein sorted text is formed. The fields are auto-populated and displayed in the second area of the window based on the sorted text.

20 Claims, 4 Drawing Sheets

(56) References Cited

U.S. PATENT DOCUMENTS

| | | | |
|---|---|---|---|
| 7,069,240 B2 * | 6/2006 | Spero | G06Q 20/20 |
| 7,103,198 B2 * | 9/2006 | Huang | G06K 9/00463 |
| | | | 360/48 |
| 7,305,129 B2 | 12/2007 | Chellapilla et al. | |
| 7,729,928 B2 * | 6/2010 | Backhaus | G06Q 10/06 |
| | | | 705/2 |
| 7,974,877 B2 * | 7/2011 | Ramanathan | G06Q 10/10 |
| | | | 705/14.49 |
| 9,753,908 B2 * | 9/2017 | Gitlin | G06F 40/174 |
| 10,558,880 B2 * | 2/2020 | Guzman | G06Q 40/123 |
| 2003/0112270 A1 * | 6/2003 | Newell | G06F 16/954 |
| | | | 715/738 |
| 2003/0179400 A1 * | 9/2003 | Kofman | G06F 3/1247 |
| | | | 358/1.13 |
| 2004/0181749 A1 * | 9/2004 | Chellapilla | G06F 17/30557 |
| 2007/0168382 A1 | 7/2007 | Tillberg et al. | |
| 2009/0044095 A1 * | 2/2009 | Berger | G06F 16/258 |
| | | | 715/226 |
| 2009/0132605 A1 * | 5/2009 | Nielsen | G06F 17/30557 |
| 2009/0208103 A1 * | 8/2009 | Lin | H04N 1/00355 |
| | | | 382/173 |
| 2010/0138343 A1 * | 6/2010 | Davila | G06Q 20/042 |
| | | | 705/43 |
| 2012/0040717 A1 * | 2/2012 | Levy | H04N 5/23212 |
| | | | 455/556.1 |
| 2012/0166206 A1 * | 6/2012 | Feely | G06Q 10/10 |
| | | | 705/1.1 |
| 2014/0219583 A1 * | 8/2014 | Bezine | G06Q 10/10 |
| | | | 382/306 |
| 2017/0109610 A1 * | 4/2017 | Macciola | G06K 9/00449 |

\* cited by examiner

FIG. 2

“METHODS AND DEVICES FOR ENABLING COMPUTERS TO AUTOMATICALLY ENTER INFORMATION INTO A UNIFIED DATABASE FROM HETEROGENEOUS DOCUMENTS”

BACKGROUND INFORMATION

1. Field

The present disclosure relates to methods and devices for enabling computers to automatically enter information into a unified database from heterogenous documents.

2. Background

Optical character recognition (OCR) of scanned or other electronic documents has been used to aid users in extracting text data from electronic picture files, portable document format (PDF) files, or other types of files which can be used to display text information on a computer screen. In some cases, the resulting text information can be copied and pasted into other documents or manually transferred as input into other software programs. However, the inability to interpret such information has prevented computers from automatically performing optical character recognition and then automatically transferring such information into desired specific data fields for entry into a unified database.

SUMMARY

The illustrative embodiments provide for a computer-implemented method of enabling a computer to automatically enter information into a unified database from heterogenous documents. The computer-implemented method includes receiving, at a processor, an image file. The computer-implemented method also includes displaying, by the processor, the image file in a first area of a window rendered on a tangible display device. The computer-implemented method also includes displaying, by the processor, fields for data entry in a second area of the window. The computer-implemented method also includes performing, by the processor, optical character recognition on the image file. The computer-implemented method also includes identifying, by the processor, at least one parameter of text in the image file. The computer-implemented method also includes comparing, by the processor, the at least one parameter of the text to at least one of a plurality of stored parameters. The computer-implemented method also includes sorting, by the processor, the text according to the at least one of the plurality of stored parameters into a plurality of categories, wherein sorted text is formed. The computer-implemented method also includes auto-populating and displaying, by the processor, the fields in the second area of the window based on the sorted text.

The illustrative embodiments also contemplate a non-transitory computer-recordable storage medium storing program code, which when executed by a processor, performs the above method. The illustrative embodiments also contemplate a computer including a processor and a non-transitory computer-recordable storage medium storing program code, which when executed by the processor, performs the above method.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 2 illustrates another sample screenshot of a user interface for software configured to receive image files and auto populate specific fields in a unified database, in accordance with an illustrative embodiment;

DETAILED DESCRIPTION

Figure 1:
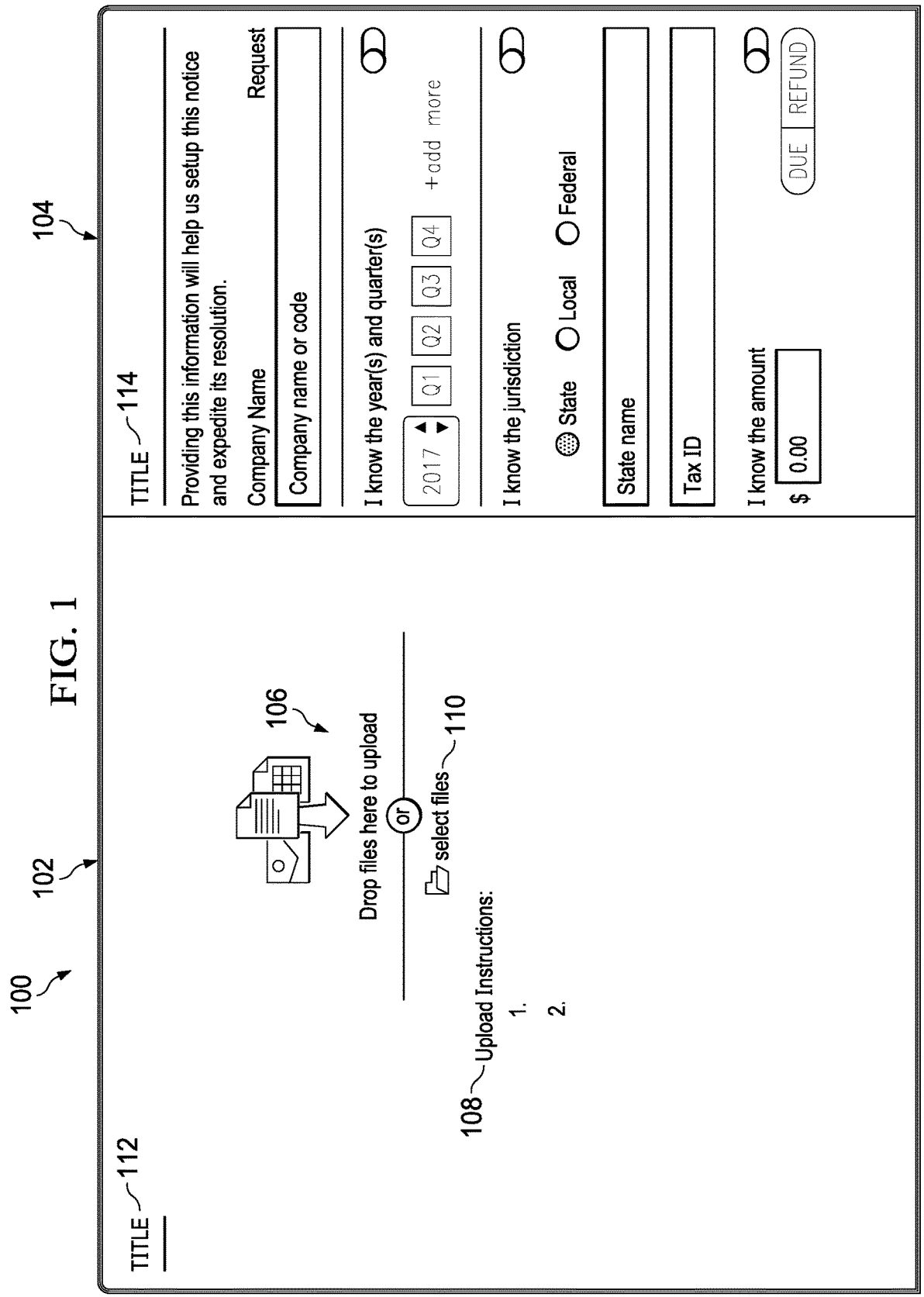
FIG. 1 illustrates a sample screenshot of a user interface for software configured to receive image files and auto populate specific fields in a unified database, in accordance with an illustrative embodiment.

The illustrative embodiments recognize and take into account that the inability to interpret the meaning of text identified by optical character recognition (OCR) has prevented computers from automatically performing OCR and then automatically transferring such information into desired specific data fields for entry into a unified database. Thus, for example, when a business desires to enter information from heterogeneous sources into a unified database, traditionally a human user must read the document, possibly on a window on the computer screen, and then manually enter the relevant information into pre-determined fields for entry into the unified database.

As used herein, the term "unified database" is defined as one or more databases, whether relational databases, content addressable databases, or other types of databases, which together are directed towards a common enterprise and use a common set of identifiers. For example, several databases, when taken together, could contain information regarding employee records, tax information, and other information, that use a common system of identifiers. For example, in a unified database, the term "employee name" would be the name of a field throughout all databases so that confusion is avoided when working with the databases in the context of a single enterprise.

In a more specific example, consider a human resources department in a large business that employs tens of thousands of employees, or alternatively a third party vendor hired to process these types of human resources transactions. In the ordinary course of business, the human resource department will receive wage garnishment orders for some of its employees. However, these wage garnishment orders come from disparate courts, jurisdictions, lawyers, and are presented in many different formats. Nevertheless, all have key information which is to be entered into the company's unified database. For example, the human resources department will record the name of the employee, the amount of garnishment, tax identification information, the payee, and other information needed to withhold money from the employee's paycheck and transfer that money to the payee designated in the court order.

However, while such information may be universal to all such orders, the manner in which the information is presented is anything but universal. For example, take something as simple as the payor's name. The terms "name", "identifier", "ID", "payor", "defendant", and potentially many other terms may be used as the key word that indicates that the text that follows is the name of the person subject to the garnishment. Thus, even though an electronic document has been processed by OCR, the computer cannot simply match terms and correctly enter the name "John Doe" into a field named "employee name" for the unified database with which the computer communicates.

This wage garnishment example is just one example. The human resource department or the third party vendor also must process tax information such as data entered into W-2s, taxes paid to multiple government agencies, and many others. The illustrative embodiments recognize and take into account that even when this data comes in the form of electronic files displayable on a computer, a human user must take an inordinate and undesirable amount of time to enter the correct information into the unified database of the human resources department or the third-party vendor.

Thus, the illustrative embodiments provide for methods and devices that address these issues and provide a means for enabling computers to automatically enter information into a unified database from heterogeneous documents. The illustrative embodiments take advantage of OCR technology, but also utilize a database of common terms to identify candidates for entries into a field of a unified database. The illustrative embodiments automatically populate fields of interest, and then display the populated fields so that a user can verify the entries. In other illustrative embodiments, the computer can automatically verify the entries into the fields to confirm that they relate to an employee. For example, if the employee name "John Doe" is automatically populated into the "employee name" field, then the computer can verify that "John Doe" is a valid entry by confirming that "John Doe" actually is an employee recorded in the unified database.

The illustrative embodiments further recognize and take into account the user interface problem of operating multiple windows of different software products; one to view the documents, and another to perform data entry. Switching between windows is inconvenient and wastes time during data entry. Thus, the illustrative embodiments also provide a means for displaying a single window which allows for selection of an image file for processing, displays the image file, and presents fields for entering data into the unified database.

The illustrative embodiments address these and other issues by providing for methods and devices for enabling computers to automatically enter information into a unified database from heterogeneous documents. In particular, attention is now turned to the figures.

FIG. 1 illustrates a sample screenshot of a user interface for software configured to receive image files and auto populate specific fields in a unified database, in accordance with an illustrative embodiment. Screenshot 100 is displayed on a tangible display device, such as display 400 of FIG. 4 and is generated by a processor, such processor unit 404 of FIG. 4, executing program code designed to render screenshot 100 and provide functionality for at least some of the images shown. This program code may be implemented as software, firmware, or both.

Screenshot 100 shows two primary areas, area 102 and area 104. An "area", as used herein, is a portion of a display on a device that shows part of the screenshot. Area 102 is used to display information related to the document or documents to be processed. Area 104 is used to display information useful for entering information into the unified database.

Attention is first turned to area 102. In area 102, instructions 106, instructions 108, and/or select files 110 are provided to prompt a user to access the files from which data is to be processed. Title 112 may be provided to remind the user as to which types of files are to be processed. Note that while this illustrative embodiment described a method for presenting a display for a user to retrieve desired image files, the illustrative embodiments also contemplate automatically presenting a user with image files for processing. The illustrative embodiments further contemplate automatically selecting and processing image files such that a user is not involved in the process of converting heterogeneous image files into entries into a unified database.

Continuing with the example of FIG. 1, area 104 is also displayed on screenshot 100. Title 114 indicates to a user the nature of what is displayed in area 104, which in this case is details of the agency notice displayed in area 102 that are to be entered in fields in area 104 for subsequent entry into the unified database. Ultimately the purpose of this data entry is to assist the enterprise in properly complying with the requirements of a specifically received agency notice. The use of area 104 is described with respect to FIG. 2.

Figure 2:
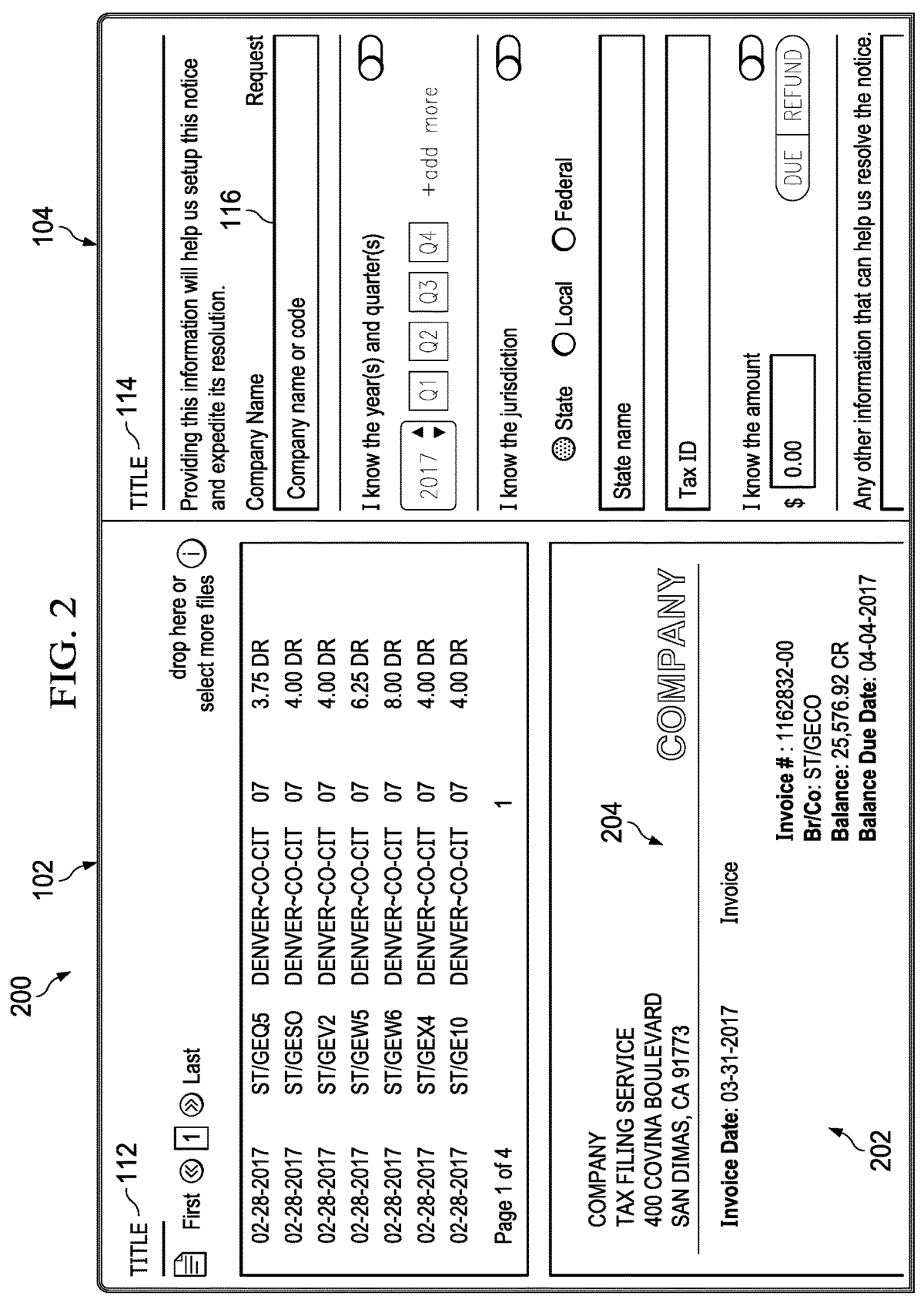

FIG. 2 illustrates another sample screenshot of a user interface for software configured to receive image files and auto populate specific fields in a unified database, in accordance with an illustrative embodiment. Screenshot 200 is related to screenshot 100 in that screenshot 200 is taken after an image file has been uploaded and is being displayed in area 102. Screenshot 200 shows an example of how a heterogeneous image file can be processed and its relevant information transmitted to fields in area 104 for entry into a unified database. Like screenshot 100, screenshot 200 is displayed on a tangible display device, such as display 414 of FIG. 4, as a result of a processor, such as processor unit 404 of FIG. 4, executing a program embodied either as program code on a non-transitory computer-recordable storage medium, or as firmware. Whether implemented as program code on a non-transitory computer-recordable storage medium or as firmware, the term "program" shall be used, though the term "program" excludes purely signal based media.

Again, area 102 shows image 202 of agency notice 204. Agency notice 204, in this illustrative embodiment, relates tax information that by law must be processed by the enterprise. In an illustrative embodiment, the program loads the image file of agency notice 204 and performs optical character recognition (OCR) on the file. The program then compares text extracted from the file based on the OCR to a plurality of terms stored in a database in order to characterize the text. The extracted text can be compared not only by text matching, but also by analyzing a location from where text was lifted, and according to patterns of text. Thus, for example, the program can determine that the name of the "company" in this particular agency notice is "Automatic Data Processing" based on the location of this term in agency notice 204 as well as the recognizable pattern of a sender's address bar near the top of the page. Additionally, the term "ADP" is associated with the company.

In one illustrative embodiment, such a comparison is not necessary. The user can simply read the page and enter the term "Automatic Data Processing" or possibly "ADP" in field 116, which is the "company name" to be entered into the unified database. The user can likewise fill out other fields in area 104.

However, preferably, sample answers are automatically generated and automatically copied into the relevant fields in area 104. Thus, for example, field 116 will be auto-populated with the term "Automatic Data Processing" or perhaps "ADP". The remaining fields and button selections will likewise be auto-populated and auto-selected.

In one illustrative embodiment, a user will review the automatically supplied entries into the fields shown in area 104. The user can then submit the entries, which are then transferred to the unified database for further processing an appropriate action. Alternatively, the user can make adjustments to the field entries and button selections prior to submission of the data.

In another illustrative embodiment, submission is automatic, and user is not required at all. In this case, all processing takes place out of sight of a user, with data automatically being input into the unified database. However, this particular illustrative embodiment is less useful the more heterogeneous the documents being processed. For example, when tax documents are received from a wide variety of companies in a wide variety of different formats, then the likelihood of errors in automatic population of the fields of interest increases. When the probability of such errors increases, adding a human reviewer to the process can increase the accuracy of the data transfer process.

One advantage to the illustrative embodiments is that a user does not have to switch between different windows of different software programs while using the program. Thus, the illustrative embodiments provide an integrated technology for reviewing heterogeneous image documents for text and entering this text data appropriately into a unified database. The illustrative embodiments may auto populate fields in one illustrative embodiment, thereby substantially increasing the speed of such data processing.

In this manner, the illustrative embodiments enable computers to automatically enter information into a unified database from heterogenous documents, thereby accomplishing a technical effect. Another technical effect of the illustrative embodiments is enabling an improved user interface for human users so that human users may more efficiently use a computer to accomplish desired data entry tasks. The illustrative embodiments are implemented solely in a computer, intrinsically a part of the operation of computer, and relate only to improving computer functionality and presentation. Thus, the illustrative embodiments cannot be accomplished by a human being, but rather only by a computer improved using the techniques described herein.

The examples provided in FIG. 1 and FIG. 2 do not necessarily limit other illustrative embodiments or the claims. Many variations are possible, based on many different types of documents, fields of interest for data entry, or other enterprise goals. The illustrative embodiments may also be extended. For example, the illustrative embodiments contemplate automatically processing multiple image documents simultaneously. The illustrative embodiments contemplate collating information for entry into fields which request information regarding, for example, now many times a given item is referenced across multiple documents. The illustrative embodiments also contemplate processing either homogenous or heterogeneous file types and formats, such as but not limited to .png, .pdf, .jpg, .jif, and many other file types. Thus, again, the illustrative embodiments are not necessarily limited to the examples given above.

Figure 3:
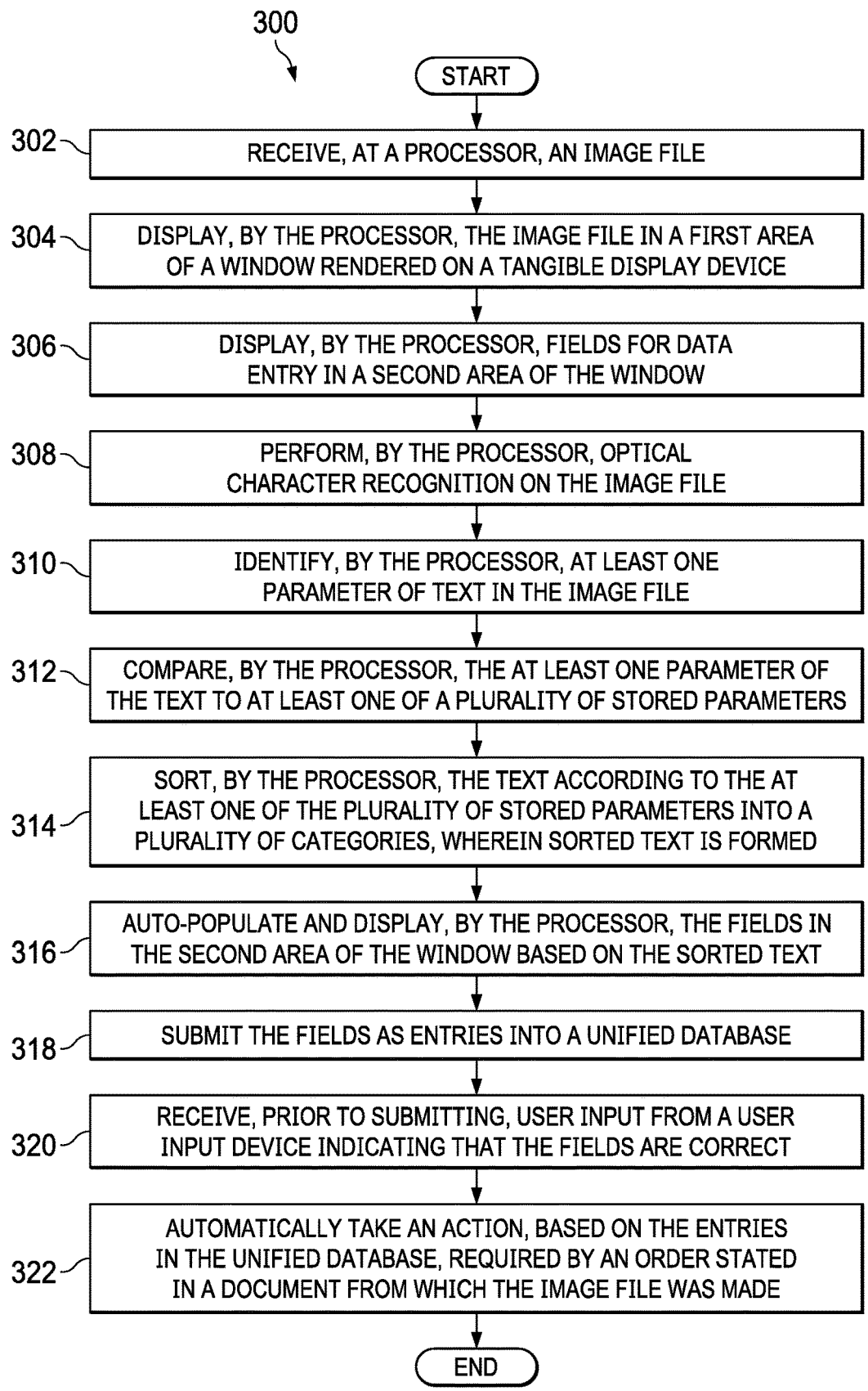
FIG. 3 illustrates a flowchart of a method for receiving image files and auto populating specific fields in a unified database, in accordance with an illustrative embodiment.

FIG. 3 illustrates a flowchart of a method for receiving image files and auto populating specific fields in a unified database, in accordance with an illustrative embodiment. Method 300 may be implemented using a data processing system, such as data processing system 400 of FIG. 4. Method 300 is a variation of the methods described above with respect to FIG. 1 and FIG. 2. Method 300 is only performable by a computer and accomplishes the technical effects described above with respect to FIG. 2. Method 300 may be characterized as a method of enabling a computer to automatically enter information into a unified database from heterogenous documents.

Method 300 includes receiving, at a processor, an image file (operation 302). Method 300 also includes displaying, by the processor, the image file in a first area of a window rendered on a tangible display device (operation 304). Method 300 also includes displaying, by the processor, fields for data entry in a second area of the window (operation 306).

Method 300 also includes performing, by the processor, optical character recognition on the image file (operation 308). Method 300 also includes identifying, by the processor, at least one parameter of text in the image file (operation 310). This parameter or parameters may take many different forms, as described above. For example, a parameter may be the text itself for text matching, a location of the text in the image file, surrounding text for pattern recognition matching, pre-stored codes, words, or phrases, color used in the image file, image file type, and potentially many others. The purpose of the parameter or parameters is to enable the computer to recognize appropriate text from potentially many different heterogeneous image files for entry into one or more specific fields for ultimate entry into a unified database.

Method 300 also includes comparing, by the processor, the at least one parameter of the text to at least one of a plurality of stored parameters (operation 312). Method 300 also includes sorting, by the processor, the text according to the at least one of the plurality of stored parameters into a plurality of categories, wherein sorted text is formed (operation 314). Sorting into a plurality of categories is specifically related to determining which alphanumeric text sequences should be applied to which fields in the second area of the display window. For example, the phrase "Automatic Data Processing" can be recognized as belonging to the category of "company name" and thus assigned to a field accordingly. Thus, method 300 also includes auto-populating and displaying, by the processor, the fields in the second area of the window based on the sorted text (operation 316).

Method 300 may be varied by including different operations, or by including additional operations, or by potentially using fewer operations. Some of these additional illustrative embodiments follow, and are shown in FIG. 3 as boxes surrounded dotted lines to indicate that they are optional additional steps taken with respect to method 300.

In one illustrative embodiment, method 300 may also include submitting the fields as entries into a unified database (operation 318). In addition to this operation illustrative embodiment, method 300 may also include receiving, prior to submitting, user input from a user input device indicating that the fields are correct (operation 320). A user could possibly edit the entries in the fields prior to submission. As an alternative to operation 320, method 300 may also include automatically taking an action, based on the entries in the unified database, required by an order stated in a document from which the image file was made (operation 322). An example of such an action would be, responsive to receiving a court order, withholding wages from an employee's paycheck and paying the withheld wages to a designated payee. Another example would be to populate a paystub and transmit the paystub to an employee or others authorized to receive the paystub. Many different actions are possible, and such actions are not necessarily limited to a human resources context.

Other variations are possible. For example, in one illustrative embodiment the first area and the second area are displayed side by side in the window, whereby use of multiple display windows is avoided. In another illustrative embodiment, the image comprises a plurality of images taken from a plurality of heterogeneous image files, and wherein auto-populating is performed for different sets of fields for each one of the plurality of heterogeneous image files.

In still another illustrative embodiment, displaying the image file and displaying the fields is performed on a web browser of a local computer, and wherein receiving, performing, identifying, comparing, sorting, and auto-populating are performed by a remote server as software as a service. In yet another illustrative embodiment, the computer-implemented method is performed on a single local computer.

Still other variations are possible. Thus, the illustrative embodiments described with respect to FIG. 3 do not necessarily limit the claimed inventions or the other examples described herein.

Figure 4:
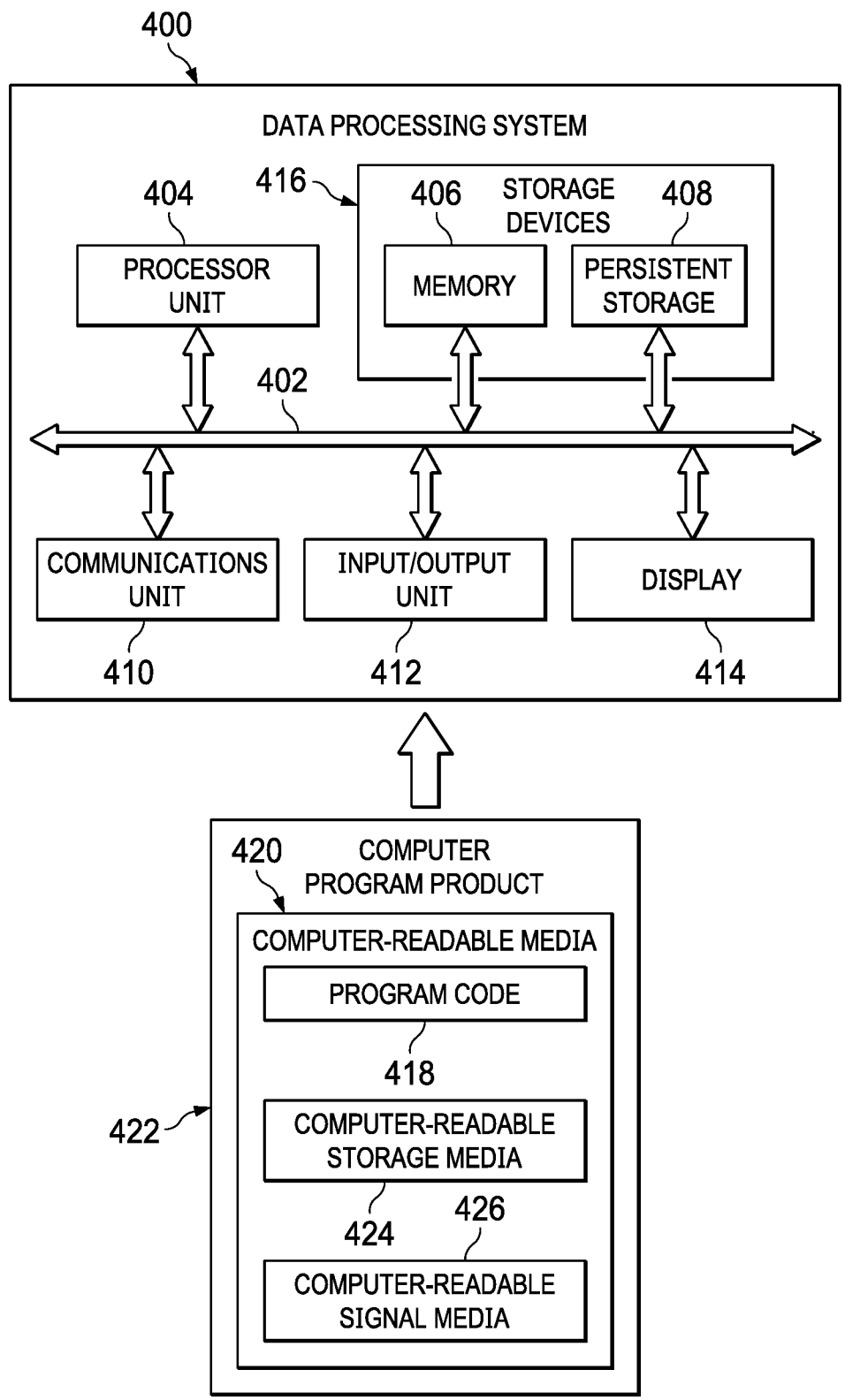
FIG. 4 illustrates a data processing system, in accordance with an illustrative embodiment.

Turning now to FIG. 4, an illustration of a data processing system is depicted in accordance with an illustrative embodiment. Data processing system 400 in FIG. 4 is an example of a data processing system that may be used to implement the illustrative embodiments, such screenshot 100 of FIG. 1, screenshot 200 of FIG. 2, method 300 of FIG. 3, or any other module or system or process disclosed herein. In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. This software may be an associative memory, content addressable memory, or software for implementing the processes described elsewhere herein. Thus, for example, software loaded into memory 406 may be software for executing method 300 of FIG. 3. Processor unit 404 may be a number of processors, a multi-processor core, or some other type of processor, depending on the particular implementation. A number, as used herein with reference to an item, means one or more items. Further, processor unit 404 may be implemented using a number of heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and/or other suitable information either on a temporary basis and/or a permanent basis. Storage devices 416 may also be referred to as computer-readable storage devices in these examples. Memory 406, in these examples, may be, for example, a random-access memory or any other suitable volatile or non-volatile storage device. Persistent storage 408 may take various forms, depending on the particular implementation.

For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output (I/O) unit 412 allows for input and output of data with other devices that may be connected to data processing system 400. For example, input/output (I/O) unit 412 may provide a connection for user input through a keyboard, a mouse, and/or some other suitable input device. Further, input/output (I/O) unit 412 may send output to a printer. Display 414 provides a mechanism to display information to a user.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer-usable program code, or computer-readable program code that may be read and executed by a processor in processor unit 404. The program code in the different embodiments may be embodied on different physical or computer-readable storage media, such as memory 406 or persistent storage 408.

Program code 418 is located in a functional form on computer-readable media 420 that is selectively removable and may be loaded onto or transferred to data processing system 400 for execution by processor unit 404. Program code 418 and computer-readable media 420 form computer program product 422 in these examples. In one example, computer-readable media 420 may be computer-readable storage media 424 or computer-readable signal media 426. Computer-readable storage media 424 may include, for example, an optical or magnetic disk that is inserted or placed into a drive or other device that is part of persistent storage 408 for transfer onto a storage device, such as a hard drive, that is part of persistent storage 408. Computer-readable storage media 424 also may take the form of a persistent storage, such as a hard drive, a thumb drive, or a flash memory, that is connected to data processing system 400. In some instances, computer-readable storage media 424 may not be removable from data processing system 400.

Alternatively, program code 418 may be transferred to data processing system 400 using computer-readable signal media 426. Computer-readable signal media 426 may be, for example, a propagated data signal containing program code 418. For example, computer-readable signal media 426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 418 may be downloaded over a network to persistent storage 408 from another device or data processing system through computer-readable signal media 426 for use within data processing system 400. For instance, program code stored in a computer-readable storage medium in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 404 may take the form of a hardware unit that has circuits that are manufactured or configured for a particular use. This type of hardware may perform operations without needing program code to be loaded into a memory from a storage device to be configured to perform the operations.

For example, when processor unit 404 takes the form of a hardware unit, processor unit 404 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 418 may be omitted because the processes for the different embodiments are implemented in a hardware unit.

In still another illustrative example, processor unit 404 may be implemented using a combination of processors found in computers and hardware units. Processor unit 404 may have a number of hardware units and a number of processors that are configured to run program code 418. With this depicted example, some of the processes may be implemented in the number of hardware units, while other processes may be implemented in the number of processors.

As another example, a storage device in data processing system 400 is any hardware apparatus that may store data. Memory 406, persistent storage 408, and computer-readable media 420 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406, or a cache, such as found in an interface and memory controller hub that may be present in communications fabric 402.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer-readable medium can generally be any tangible apparatus that can contain, store, communicate, propagate, or transport the program for use by or in connection with the instruction execution system, apparatus, or device.

The computer-usable or computer-readable medium can be, for example, without limitation an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer-usable or computer-readable medium may contain or store a computer-readable or computer-usable program code such that when the computer-readable or computer-usable program code is executed on a computer, the execution of this computer-readable or computer-usable program code causes the computer to transmit another computer-readable or computer-usable program code over a communications link. This communications link may use a medium that is, for example without limitation, physical or wireless.

A data processing system suitable for storing and/or executing computer-readable or computer-usable program code will include one or more processors coupled directly or indirectly to memory elements through a communications fabric, such as a system bus. The memory elements may include local memory employed during actual execution of the program code, bulk storage, and cache memories which provide temporary storage of at least some computer-readable or computer-usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
    automatically entering, by a processor, information into a unified database from heterogenous documents by a computer:
        receiving, by the processor, an image file, the image file including text;
        displaying, by the processor, the image file in a first area of a window, wherein the window is rendered on a tangible display device;
        displaying, by the processor, fields for data entry in a second area of the window;
        performing, by the processor, optical character recognition on the image file;
        identifying, by the processor, at least one parameter of the text in the image file;
        comparing, by the processor, the at least one parameter of the text to employee information stored in the unified database, the employee information comprising a plurality of stored parameters about human resources records, payroll records, and tax information;
        sorting, by the processor, the text according to the at least one of the plurality of stored parameters into a plurality of categories, wherein sorted text is formed; and
        auto-populating and displaying, by the processor, the fields for data entry in the second area of the window based on the sorted text; and
    after automatically entering information into the unified database, automatically taking, by the processor, an action:
        based on the information entered into the unified database; and
        as required by an order stated in a document from which the image file was made, wherein the order is for at least one of withholding wages from an employee's paycheck, or paying withheld wages to a designated payee.

2. The method of claim 1 further comprising:
    submitting, by the processor, the fields for data entry as entries into a unified database.

3. The method of claim 2 further comprising:
    receiving, by the processor, prior to submitting, user input from a user input device indicating that the fields for data entry are correct.

4. The method of claim 2, wherein the order is a court order.

5. The method of claim 1, wherein the first area and the second area are displayed side by side in the window, whereby use of multiple display windows is avoided.

6. The method of claim 1, wherein the image file comprises a plurality of images taken from a plurality of heterogeneous image files, and wherein auto-populating is performed for different sets of fields for each one of the plurality of heterogeneous image files.

7. The method of claim 1, wherein displaying the image file and displaying the fields for data entry are performed on a web browser of a local computer, and wherein receiving, performing, identifying, comparing, sorting, and auto-populating are performed by a remote server as software as a service.

8. The method of claim 1, wherein the computer is a single local computer.

9. A computer program product, comprising:
    a non-transitory computer-recordable storage medium comprising instructions, wherein when executed by a processor, the instructions automatically enter information into a unified database from heterogenous documents, the instructions comprising:
        first program code for receiving an image file, the image file including text;
        second program code for displaying the image file in a first area of a window, wherein the window is rendered on a tangible display device;
        third program code for displaying fields for data entry in a second area of the window;
        fourth program code for performing optical character recognition on the image file;
        fifth program code for identifying at least one parameter of the text in the image file;
        sixth program code for comparing the at least one parameter of the text to employee information stored in the unified database, the employee information comprising plurality of stored parameters about human resources records, payroll records, and tax information;
        seventh program code for sorting the text according to the at least one of the plurality of stored parameters into a plurality of categories, wherein sorted text is formed;
        eighth program code for auto-populating and displaying the fields for data entry in the second area of the window based on the sorted text; and
        ninth program code for, after auto-populating, automatically taking an action:
            based on information included in the auto-populating; and
            as required by an order stated in a document from which the image file was made, wherein the order relates to disposition of wages of an employee.

10. The computer program product of claim 9, wherein the instructions further comprise:
    tenth program code for submitting the fields for data entry as entries into a unified database.

11. The computer program product of claim 10, wherein the instructions further comprise:
    eleventh program code for receiving, prior to submitting, user input from a user input device indicating that the fields for data entry are correct.

12. The computer program product of claim 9, wherein the order is a court order for at least one of:
    withholding wages from a paycheck of the employee; or
    paying withheld wages to a designated payee.

13. The computer program product of claim 9 wherein the instructions are configured to display the first area and the second area in a side by side arrangement in the window.

14. The computer program product of claim 9, wherein the image file comprises a plurality of images taken from a plurality of heterogeneous image files, and wherein the auto-populating is executed for different sets of fields for each one of the plurality of heterogeneous image files.

15. A computer comprising:
    a processor; and
    a non-transitory computer-recordable storage medium comprising instructions, which when executed by the processor, automatically enters information into a unified database from heterogenous documents, the instructions comprising:

first program code for receiving an image file, the image file including text;

second program code for displaying the image file in a first area of a window rendered on a tangible display device;

third program code for displaying fields for data entry in a second area of the window;

fourth program code for performing optical character recognition on the image file;

fifth program code for identifying at least one parameter of the text in the image file;

sixth program code for comparing the at least one parameter of the text to employee information stored in the unified database, the employee information comprising plurality of stored parameters about human resources records, payroll records, and tax information;

seventh program code for sorting the text according to the at least one of the plurality of stored parameters into a plurality of categories, wherein sorted text is formed;

eighth program code for auto-populating and displaying the fields for data entry in the second area of the window based on the sorted text; and ninth program code for, after auto-populating, automatically taking an action:

based on information included in the auto-populating; and as required by an order stated in a document from which the image file was made, wherein the order is a court order.

16. The computer of claim 15, wherein the instructions further comprise:

tenth program code for submitting the fields for data entry as entries into a unified database.

17. The computer of claim 16, wherein the instructions further comprise:

eleventh program code for receiving, prior to submitting, user input from a user input device indicating that the fields for data entry are correct.

18. The computer of claim 15, wherein the court order is for at least one of:

withholding wages from an employee's paycheck; or paying withheld wages to a designated payee.

19. The computer of claim 15, wherein the instructions are configured to display the first area and the second area in a side by side arrangement in the window.

20. The computer of claim 15, wherein the image file comprises a plurality of images taken from a plurality of heterogeneous image files, and wherein the auto-populating is executed for different sets of fields for each one of the plurality of heterogeneous image files.

* * * * *